Patented Nov. 7, 1944

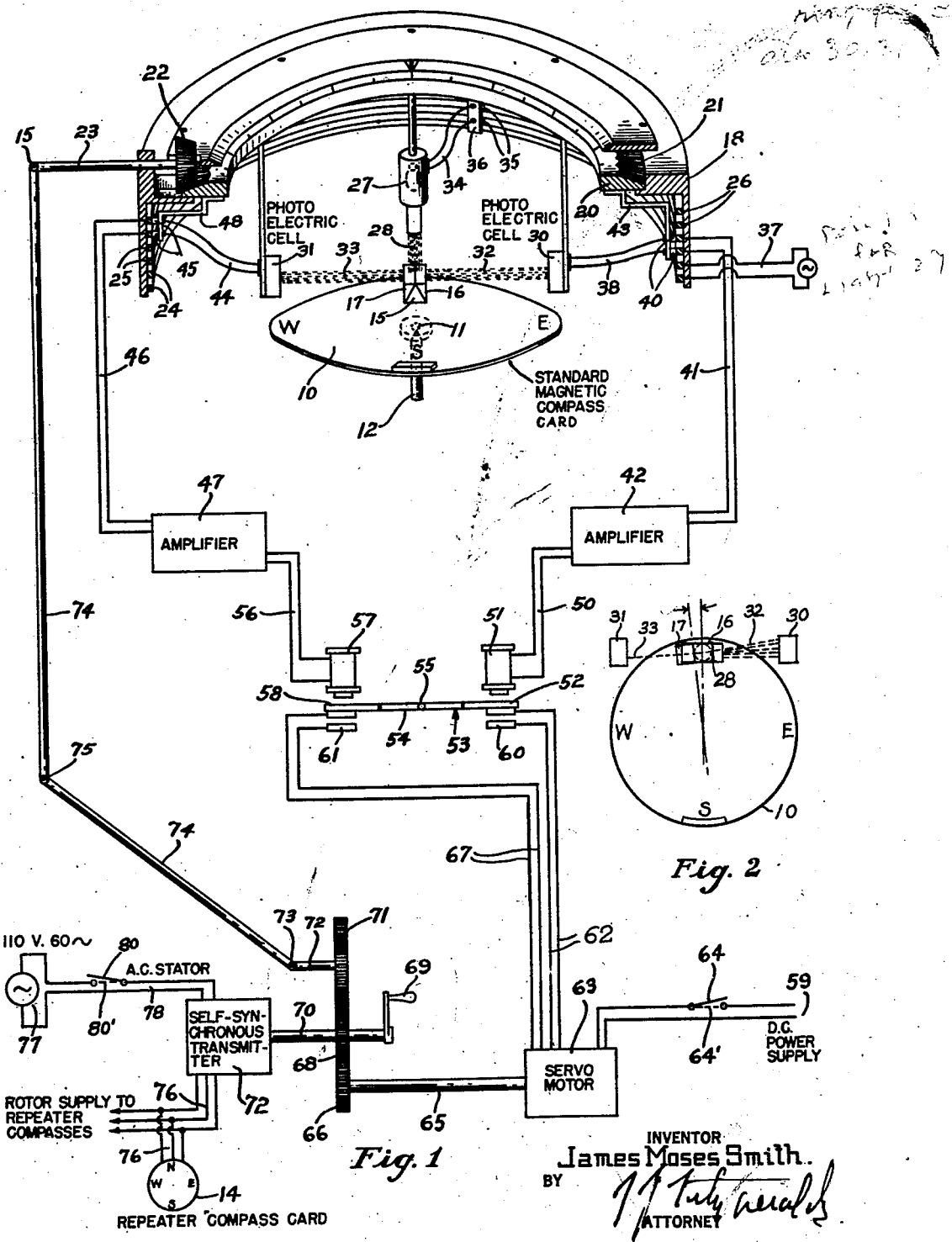

2,361,973

UNITED STATES PATENT OFFICE 2,361,973

MAGNETIC COMPASS REPEATER

James Moses Smith, United States Navy

Application June 4, 1943, Serial No. 489,665

3 Claims. (Cl. 33—226)

(Granted under the act of March 3, 1883, as amended April 30, 1928; 370 O. G. 757)

This invention relates to a magnetic compass repeater and has for an object to provide an improved system for operating compass repeaters from a magnetic compass, being especially intended for use in operating the gyro compass repeaters from a magnetic compass, should the gyro compass break down. Ordinarily in the event of failure of the gyro compass, when it becomes necessary to steer by the magnetic compass, the aids to the navigator, the gunnery officer, and other stations where the repeater compasses are located are no longer available. It is an object of this invention to provide a means for connecting a magnetic compass to the gyro repeater compasses so that the gyro repeater compasses will then follow the magnetic compass at all the repeater compass stations.

A further object of this invention is to provide a means for so connecting a magnetic compass to a compass repeater system that there will be no frictional or mechanical drag affecting the compass card but which will leave the compass card free to operate under the magnetic pull of the polar field without any mechanically added errors or lags.

With the foregoing and other objects in view, the invention consists in the construction, combination and arrangement of parts hereinafter described and illustrated in the drawing in which:

Figure 1 is a schematic outline of the invention utilizing a block diagram.

Figure 2 is a fragmentary plan view of the compass card prisms and cells.

There is shown at 10 a standard magnetic compass card mounted in any conventional manner so that it may rotate freely about its center pivot point 11 on a shaft 12. This compass card 10 is free to rotate and take its position under the influence of the polar fields. At 14 there is shown one of a series of repeater compass cards. This compass card 13 may be the compass card of one of the regular gyro repeater compasses located at various stations throughout the ship or vehicle and is ordinarily connected to the gyro compass of the ship. However, if and when the gyro compass of the ship should become inoperative, then it is the essence of this invention that the same gyro repeater compasses may be connected to and operated by a standard magnetic compass card 10 which is connected to the various repeater compasses by the system herein disclosed.

Mounted adjacent one edge of the compass card 10 is a double prism support 15 carrying two prisms 16 and 17. Concentric with and above the compass card 10 is a stationary supporting ring 18 which also acts as a bearing for an azimuth ring gear 20. This ring gear 20 is provided with beveled teeth 21 which are meshed with the teeth of a beveled gear 22 keyed on a shaft 23. Also supported by the stationary ring 18 are three pairs of electrical ring conductors 24, 25, and 26. Depending from the azimuth ring gear 20 is an electric light 27 for projecting a beam of light 28 so that it will strike the double prisms 16 and 17.

The light 27 is so supported on the ring gear 20 with relation to the compass card 10 that it is at the same radial distance from the pivot point 11 of the compass card 10 that the double prisms 16 and 17 are from this same pivot point 11. Also depending from the ring gear 20 on the opposite sides of the light 27 are two photo electric cells 30 and 31. These cells 30 and 31 and the light source 27, being all mounted on the same ring gear 20, are movable when the ring shaft 20 moves, but on the other hand, the photo electric cells 30 and 31 and the light source 27 are stationary relative to each other.

They are so mounted with relation to the double prisms 16 and 17 that when the light source 27 is directly over the double prisms 16 and 17, the beam from the light source 27 is split into two beams 32 and 33, beam 32 being reflected by the prism 17 to the photo electric cell 31. Electric light 27 receives its current by means of leads 34 connected to electric brushes 35 mounted on a brush support 36 also carried by the ring gear 20. The electric brushes 35 are in contact with the pair of ring conductors 24 which in turn are connected by leads 37 to a suitable source of electrical power.

Photo electric cell 30 is connected by leads 38 through brushes 40 to the pair 25 of ring conductors which in turn are provided with electrical leads 41 to the amplifier shown in block diagram at 42. The brushes 40 are mounted on bracket 43 depending from ring gear 20. The other photo electric cell 31 is similarly connected by leads 44 through brushes 45 and pair 26 of ring conductors to leads 46 to the amplifier 47, the brushes 45 being also mounted on a bracket 48 depending from ring gear 20.

The amplifier 42 is connected by leads 50 to a solenoid 51 for attracting one armature 52 of a balanced switch arm 53 which includes an insulated section 54 and is pivoted as at 55. The other amplifier 47 is connected by leads 56 for operating the solenoid 57 so as to attract the other armature 58 at the other end of the switch arm 53. On opposite sides of the armatures 52 and 58 from the solenoids 51 and 57, there are provided contacts 60 and 61, either one of which will be closed by the back of its adjacent armature when the other armature is attracted by its solenoid. So long as the compass card 10 is in the position shown with the beam 28 split equally into the beams 32 and 33, the photo electric cells 30 and 31 will each equally actuate their amplifiers 42 and 47 and thus produce an equal attraction by the solenoids 51 and 57 to the armatures 52 and 58, thus keeping the switch 53 in balanced position However, when the compass card 10 rotates in either direction, it will, through the prism support 15, move one or the other prisms 16 and 17 out of the beam 28 thus immediately diminishing or eliminating one or the other of the split beams 32 or 33. Assuming that it has moved clockwise, beam 32 would be diminished or eliminated so that photoelectric cell 31 alone will be actuated. This will cause this amplifier 47 to actuate the solenoid 57 and attract the armature 58, thereby causing the back of the armature 52 to close the contacts 60. Contacts 60 are connected through leads 62 to one side of servomotor 63 which receives its power from a D. C. power supply 59 through a switch 64 and is provided with a shaft 65 carrying a gear 66. With the switch 64 in the closed position 64', closing of the contacts 60 will, through the servomotor 63, cause the gear 66 to rotate in one direction. On the other hand the gear 66 will be rotated in the opposite direction if the compass card 10 rotates counter-clockwise as such movement will cause the closing of contacts 61 connected by leads 67 to the opposite side of the same servomotor 63 to thus cause it to rotate in the opposite direction.

The gear 66 is meshed with a gear 68 on a shaft 70 having a crank handle 69 and connected by a sleeve coupling within a self-synchronous transmitter 72 so that the gear 68 may be enmeshed with or disengaged from the gear 66. Another gear 71 in the same plane with the gear 66 is also in mesh with the gear 68 when the gear 68 is in mesh with the gear 66.

This gear 71 is mounted on a shaft 72 connected by means of a universal joint 73 through a train of shafts 74 and universal joints 75 to the shaft 23 which carries the beveled gear 22 meshed to the teeth 21 of the azimuth ring gear 20. The self-synchronous transmitter 72 is connected by leads 76 to each of the repeater compasses 14 that it is desired to operate. These repeater compasses 14 are preferably the same repeater compasses that are connected to the gyro compass of the ship or vehicle. A 110 volt, 60 cycle stator power supply 77 is connected by leads 78 through the switch 80 to the stator of the self-synchronous transmitter 72.

In operation when it is necessary to connect the repeater compasses 14 to the magnetic compass card 10, both supply switches 64 and 80 are placed in open positions. The crank 69 is rotated with the gear 68 in mesh with gear 71 thus causing, through the train of shafts 74 and universal joints 75, the shaft 23 through gear 22 to rotate ring gear 20 until the light beam 28 is exactly split by the double prisms 16 and 17 into the two beams 32 and 33. The crank handle 69 is then operated to slide the shaft 70 in its sleeve coupling until the gear 68 is disengaged from both gears 66 and 71.

Then after placing switch 80 in closed position 80', the crank 69 is rotated to make the compass cards on the repeater compasses 14 line up with the magnetic compass card 10 at the same time allowing for any magnetic compass error. Then the crank 69 is operated to cause the gear 68 to reengage both gears 66 and 71 and the D. C. power supply 81 is connected to the servomotor 63 by moving the switch 64 to closed position 64'.

The repeater compass cards will now be in position to follow all the movements of the magnetic compass card 10, for as the magnetic compass card 10 rotates in either direction, it will diminish or break one or the other of the light beams 32 or 33 to the photo electric cells 30 or 31, as already described, thus unbalancing the switch 53, and through servomotor 63 it will operate the self-synchronous transmitter 72 to cause the repeater compasses 14 to follow the movement of the compass card 10. Simultaneously through the gear train, it will cause the ring gear 20 to follow the movement of the compass card 10 and catch up to it when it stops with the beam 28 again split into two equal beams 32 and 33, thus stopping the operation of the servomotor and stopping the movement of the repeater compass cards.

Other modifications and changes in the number and arrangement of the parts may be made by those skilled in the art without departing from the nature of the invention, within the scope of what is hereinafter claimed.

The invention described herein may be manufactured and used by and for the Government of the United States of America for governmental purposes without the payment of any royalties thereon or therefor.

What is claimed is:

1. A follow up for a magnetic compass having a card comprising a double prism support, said double prism support being mounted on said compass card, double prism means carried by said support, a light source directing a light beam at said double prism means, said double prism means dividing said light beam into two separated light beams, a pair of photo electric cells, one of said photo cells being in the path of one of said divided light beams and the other of said photo electric cells being in the path of the other of said divided light beams, and means controlled by differential energization of said photo electric cells when the light beam to one of said photo electric cells is diminished or discontinued by the movement of the double prism support on said compass card to cause said light source to move correspondingly.

2. A follow up for a magnetic compass having a card comprising a double prism support, said double prism support being mounted on said compass card, double prism means carried by said support, a light source directing a light beam at said double prism means, said double prism means dividing said light beam into two separated light beams, a pair of photo electric cells, one of said photo cells being in the path of one of said divided light beams and the other of said photo electric cells being in the path of the other of said divided light beams, and means controlled by differential energization of said photo electric cells when the light beam to one of said photo electric cells is diminished or discontinued by the movement of the double prism support on said compass card to cause said light source to move correspondingly, movable supporting means for supporting said light source and said pair of photo electric cells in fixed relation to each other thereon, and actuating means causing said movable supporting means to chase said double prism support as long as it is moving and to stop when it caught up with said double prism support.

3. A follow up for a magnetic compass having a card comprising a double prism support, means for keeping said double prism support in a definite relation to the polar fields, double prism means carried by said support, a light source directing a light beam at said double prism means, said double prism means dividing said light beam into two separated light beams, a pair of photo electric cells, one of said photo cells being in the path of one of said divided light beams and the other of said photo electric cells being in the path of the other of said divided light beams, and means controlled by differential energization of said photo electric cells when the light beam to one of said photo electric cells is diminished or discontinued by the movement of the double prism support in response to the polar fields to cause said light source to move correspondingly.

JAMES MOSES SMITH.